United States Patent
Baran, Jr. et al.

(10) Patent No.: US 10,059,781 B2
(45) Date of Patent: Aug. 28, 2018

(54) ACID-MODIFIED NANOPARTICLES, DUAL PART POLYMERIZABLE COMPOSITIONS, AND METHODS

(71) Applicant: 3M INNOVATIVE PROPERTIES COMPANY, St. Paul, MN (US)

(72) Inventors: Jimmie R. Baran, Jr., Prescott, WI (US); James E. Garbe, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 163 days.

(21) Appl. No.: 14/784,105

(22) PCT Filed: Jun. 17, 2014

(86) PCT No.: PCT/US2014/042705
§ 371 (c)(1),
(2) Date: Oct. 13, 2015

(87) PCT Pub. No.: WO2014/209680
PCT Pub. Date: Dec. 31, 2014

(65) Prior Publication Data
US 2016/0108143 A1    Apr. 21, 2016

Related U.S. Application Data

(60) Provisional application No. 61/840,898, filed on Jun. 28, 2013.

(51) Int. Cl.
| | |
|---|---|
| *C08F 4/52* | (2006.01) |
| *C08F 4/58* | (2006.01) |
| *C08F 2/44* | (2006.01) |
| *C08L 33/06* | (2006.01) |
| C08F 220/14 | (2006.01) |
| C08F 220/18 | (2006.01) |
| C08F 222/10 | (2006.01) |

(52) U.S. Cl.
CPC ............... *C08F 4/58* (2013.01); *C08F 2/44* (2013.01); *C08L 33/06* (2013.01); *C08F 220/14* (2013.01); *C08F 2220/1858* (2013.01); *C08F 2222/1013* (2013.01)

(58) Field of Classification Search
CPC ...... C08F 2/44; C08F 4/58; C08F 4/44; C08F 220/14; C08F 2220/1858; C08F 2222/1013; C08L 33/06
See application file for complete search history.

(56) References Cited

U.S. PATENT DOCUMENTS

| | | |
|---|---|---|
| 4,356,296 A | 10/1982 | Griffith |
| 4,642,126 A | 2/1987 | Zador |
| 4,648,843 A | 3/1987 | Mitra |
| 4,652,274 A | 3/1987 | Boettcher |
| 4,665,217 A | 5/1987 | Reiners |
| 4,752,338 A | 6/1988 | Reiners |
| 5,026,902 A | 6/1991 | Fock |
| 5,076,844 A | 12/1991 | Fock |
| 5,539,070 A | 7/1996 | Zharov |
| 5,621,143 A | 4/1997 | Pocius |
| 5,686,544 A | 11/1997 | Pocius |
| 5,872,197 A | 2/1999 | Deviny |
| 6,566,413 B1 | 5/2003 | Weinmann |
| 6,624,236 B1 | 9/2003 | Bissinger |
| 6,740,716 B2 | 5/2004 | Webb |
| 6,812,308 B2 | 11/2004 | Deviny |
| 6,852,795 B2 | 2/2005 | Bissinger |
| 6,852,822 B1 | 2/2005 | Bissinger |
| 7,241,437 B2 | 7/2007 | Davidson |
| 7,649,068 B2 | 1/2010 | Ahn |
| 7,732,543 B2 | 6/2010 | Loch |
| 8,119,245 B2 | 2/2012 | Kendi |
| 2009/0247720 A1 | 10/2009 | Wang |

(Continued)

FOREIGN PATENT DOCUMENTS

| | | |
|---|---|---|
| JP | 2008-518082 | 5/2008 |
| JP | 2008-527077 | 7/2008 |
| JP | 2012-516932 | 7/2012 |
| WO | WO 1997-07171 | 2/1997 |
| WO | WO 1998-17694 | 4/1998 |
| WO | WO 2000-38619 | 7/2000 |
| WO | WO 2000-42092 | 7/2000 |
| WO | WO 2001-07444 | 2/2001 |
| WO | WO 2001-92271 | 12/2001 |
| WO | WO 2006/049792 | 5/2006 |
| WO | WO 2006/073696 | 7/2006 |
| WO | WO-2006008571 A1 * | 8/2006 |
| WO | WO 2009-085926 | 7/2009 |
| WO | WO 2010/091001 | 8/2010 |
| WO | WO 2010-149742 | 12/2010 |
| WO | WO 2014-099516 | 6/2014 |

OTHER PUBLICATIONS

Sonnenschein, "Physical and Chemical Probes of the Bond Strength between Trialkylboranes and Amines and Their Utility as Stabilized Free Radical Polymerization Catalysts", Macromolecules, 2006; vol. 39, pp. 2507-2513.

(Continued)

*Primary Examiner* — Irina S Zemel
*Assistant Examiner* — Jeffrey S Lenihan
(74) *Attorney, Agent, or Firm* — Adrian L. Pishko

(57) ABSTRACT

A dual part polymerizable composition is provided including a first part containing at least one triorganoborane-amine complex having the structure Z—NHR$^1$—B(R$^2$)$_3$ wherein: Z is an organic group; R$^1$ is H or an organic group; and each R$^2$ is independently an organic group bound to the boron atom through a carbon atom. The composition also includes a second part containing a polymerizable component and acidified nanoparticles including acid groups, where each acidified nanoparticle includes an inorganic core and acid groups. The acid groups include acid stabilizers and/or acid groups covalently bound to the inorganic core through an organic group. Each inorganic core is typically an inorganic oxide core, e.g., silica, zirconia, or alumina.

20 Claims, No Drawings

(56) References Cited

U.S. PATENT DOCUMENTS

2010/0221429 A1\* 9/2010 Ahn .................. B41M 1/06
427/256
2010/0276374 A1 11/2010 Kolb

OTHER PUBLICATIONS

Welch, "Polymerization of Methyl Methacrylate by Triethylboron-Oxygen Mixtures", Journal of Polymer Science, 1962; vol. 61, pp. 243-252.
International Search report for PCT Application No. PCT/US2014/042705 dated Jan. 27, 2015, 3 pages.

\* cited by examiner

ACID-MODIFIED NANOPARTICLES, DUAL PART POLYMERIZABLE COMPOSITIONS, AND METHODS

CROSS REFERENCE TO RELATED APPLICATIONS

This application is a national stage filing under 35 U.S.C. 371 of PCT/US2014/042705, filed Jun. 17, 2014, which claims priority to U.S. Application No. 61/840,898, filed Jun. 28, 2013, the disclosure of which is incorporated by reference in its/their entirety herein.

FIELD

Acid-modified nanoparticles, dual part polymerizable compositions, and methods are provided.

BACKGROUND

Small molecule Lewis acid/base complexes of organoboranes and amines are known. They can be formed by the reaction of a triorganoborane (a Lewis acid) and an amine (a Lewis base). Amines that form the most stable complexes with triorganoboranes include primary amines and some secondary amines. Tertiary amines, sterically hindered secondary amines, and amines in which the nitrogen atom lone electron pair is delocalized (and thus not available to form a strong dative bond with the boron atom via the boron empty p orbital) form less stable complexes with organoboranes. The complexes have the general structure

wherein each R is independently an alkyl group, a cycloalkyl group, or an aralkyl group, and each R' is independently H, an alkyl group, or a cycloalkyl group.

The triorganoborane-amine complexes can be "decomplexed" by compounds that react with amines, thereby liberating free triorganoborane. This reaction is typically irreversible such that the amine is then no longer available to complex the triorganoborane. The free triorganoborane can react with oxygen to generate several free-radical species, some of which are known to initiate radical polymerization of unsaturated monomers, such as acrylates.

Conventional decomplexing agents have included carboxylic acids or anhydrides, which can have disadvantages such as low solubility in the compositions, cumbersome storage or handling requirements, or objectionable odor. There is a need for greater stability, and ease of storage, transportation, or handling of triorganoborane-amine complexes and decomplexing agents.

SUMMARY

The present disclosure provides dual part polymerizable compositions including triorganoborane-amine complexes, a polymerizable component, and acidified nanoparticles including acid groups. The acid groups include acid stabilizers, and/or acid groups covalently bound to an inorganic core through an organic group. The triorganoborane-amine complexes are decomplexed upon contact with the acidified nanoparticles, releasing the active species, a triorganoborane, for its intended use when the two parts of the polymerizable compositions are combined. The acidified nanoparticles are generally more easily stored, transported, and handled than liquid acids. The triorganoborane-amine complexes are typically employed in liquid form. The liberated triorganoborane is used, for example, as an initiator for polymerization reactions, such as for free radical polymerization reactions of ethylenically unsaturated monomers (e.g., acrylate monomers).

In one embodiment, the present disclosure provides a dual part polymerizable composition including a first part containing at least one triorganoborane-amine complex having the structure $Z—NHR^1—B(R^2)_3$ wherein: Z is an organic group; $R^1$ is H or an organic group; and each $R^2$ is independently an organic group bound to the boron atom through a carbon atom. The composition also includes a second part containing a polymerizable component and acidified nanoparticles including acid groups, wherein each acidified nanoparticle includes an inorganic core and acid groups, wherein the acid groups include acid stabilizers and/or acid groups covalently bound to the inorganic core through an organic group. Each inorganic core is typically an inorganic oxide core, e.g., silica, zirconia, or alumina.

In one embodiment, a method of making a polymer is provided, wherein the method includes providing a first part including at least one triorganoborane-amine complex having the structure $Z—NHR^1—B(R^2)_3$ wherein: Z is an organic group; $R^1$ is H or an organic group; and each $R^2$ is independently an organic group bound to the boron atom through a carbon atom. The method further includes providing a second part including a polymerizable component and a plurality of acidified nanoparticles comprising acid groups, wherein each acidified nanoparticle comprises an inorganic core and acid groups, wherein the acid groups comprise acid stabilizers and/or acid groups covalently bound to the inorganic core through an organic group, and combining the first part and the second part together.

The term "nanoparticle" refers to a particle having a particle size (i.e., the longest dimension of a particle, for example, the diameter of a sphere) of no greater than 100 nanometers (nm), which is a nonagglomerated and nonaggregated discrete particle, as well as agglomerated or aggregated particles having a particle size (i.e., the longest dimension of an agglomerate or aggregate, for example, the diameter of a sphere) of no greater than 100 nanometers (nm). The term "nanoparticle" herein excludes fumed or pyrogenic inorganic oxides (such as fumed silica (which is also sometimes referred to as precipitated silica), pyrogenic silica, or fumed alumina).

The term "surface-modified" with respect to a nanoparticle refers to a nanoparticle that has at least one group covalently bound to the exterior of the nanoparticle.

The term "acid stabilizer" means a compound including at least one acid group that is not covalently bound to a nanoparticle. The acidic compound is present in an amount effective to prevent a dispersion of nanoparticles in a solution or in a sol (i.e., a fluid colloidal solution) from agglomerating to a particle size of greater than 100 nanometers, or from gelling (i.e., changing from transparent or slightly hazy, such that it can be seen through in a typical flask (e.g., 250 ml round bottom flask), to a cloudy, and often viscous consistency).

The term "acid-modified" with respect to a nanoparticle refers to a nanoparticle that includes at least one acid group including acid stabilizers, acid groups covalently bound to an inorganic core through an organic group, or combinations thereof.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). In the context of the present invention, the organic groups are those that do not interfere with the formation of an organoborane-amine complex and/or monomer polymerization or ethylenically unsaturated monomers. The term "aliphatic group" means a saturated or unsaturated linear or branched hydrocarbon group. This term is used to encompass alkyl, alkenyl, and alkynyl groups, for example. The term "alkyl group" is defined below. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" is defined below. The term "heterocyclic group" means a closed ring hydrocarbon in which one or more of the atoms in the ring is an element other than carbon (e.g., nitrogen, oxygen, sulfur, etc.). Unless otherwise indicated, the organic groups typically contain at least 1 carbon atom, and often up to 30 carbon atoms. The organic group can have any suitable valency but is often monovalent or divalent.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl as used herein includes, but are not limited to, methyl, ethyl, n-propyl, n-butyl, n-pentyl, isobutyl, t-butyl, isopropyl, n-octyl, n-heptyl, ethylhexyl, and the like.

The term "cycloalkyl" refers to a closed ring alkyl group. Unless otherwise indicated, the cycloalkyl group typically has 1 to 30 carbon atoms. Examples of cycloalkyl groups include, but are not limited to, cyclopentyl, cyclohexyl, cycloheptyl, adamantyl, norbornyl, and the like.

The term "alkylene group" refers to a divalent group that is a radical of an alkane and includes straight-chain, branched, and cyclic groups, and combinations thereof, include both unsubstituted and substituted alkylene groups. Unless otherwise indicated, the alkylene group typically has 1 to 20 carbon atoms, 1 to 10 carbon atoms, 1 to 6 carbon atoms, or 1 to 4 carbon atoms.

The term "aryl" refers to a monovalent group that is aromatic and optionally carbocyclic. The aryl has at least one aromatic ring and can have one or more additional carbocyclic rings that are fused to the aromatic ring. Any additional rings can be unsaturated, partially saturated, saturated, or aromatic. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group. The term "alkaryl" refers to a monovalent group that is an aryl substituted with an alkyl group. For both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "hydrolyzable" refers to a group that can react with water having a pH of 1 to 10 under conditions of atmospheric pressure. A hydroxyl group often results from the hydrolysis reaction. The hydroxyl group often undergoes further reactions. Typical hydrolyzable groups include, but are not limited to, alkoxy, aryloxy, aralkyloxy, alkaryloxy, acyloxy, or halo. As used herein, the term is often used in reference to one or more groups bound to a silicon atom in a silyl group.

The term "non-hydrolyzable group" refers to a group that typically does not react with water having a pH of 1 to 10 under conditions of atmospheric pressure. Typical non-hydrolyzable groups include, but are not limited to, alkyl, aryl, aralkyl, and alkaryl. As used herein, the term is often used in reference to one or more groups bonded to a silicon atom in a silyl group.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term at least one. The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

A group that may be the same or different is referred to as being "independently" something. That is, when a group is present more than once in a formula described herein, each group is independently selected, whether specifically stated or not. For example, when more than one $R^2$ group is present in a formula, each $R^2$ group is independently selected. Furthermore, subgroups contained within these groups are also independently selected.

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

Dual Part Polymerizable Composition

The present disclosure provides a dual part polymerizable composition including a first part containing at least one triorganoborane-amine complex having the structure Z—NHR$^1$—B(R$^2$)$_3$ wherein: Z is an organic group; R$^1$ is H or an organic group; and each R$^2$ is independently an organic group bound to the boron atom through a carbon atom. Each acidified nanoparticle includes an inorganic core and acid groups, wherein the acid groups include acid stabilizers, acid groups covalently bound to the inorganic core through an organic group, or combinations thereof. Each inorganic core is typically an inorganic oxide core, e.g., silica, zirconia, or alumina.

Acidified Nanoparticles

The present disclosure provides acidified nanoparticles for decomplexing triorganoborane-amine complexes, to initiate polymerization of a polymerizable composition. As noted above, the acidified nanoparticles are advantageously employed in a dual part polymerizable composition containing a first part comprising at least one triorganoborane-amine complex. The second part comprises a polymerizable component and a plurality of acidified nanoparticles comprising acid groups, wherein each acidified nanoparticle comprises an inorganic core and acid groups. The acid groups comprise acid stabilizers, acid groups covalently bound to the inorganic core through an organic group, or combinations thereof.

A plurality of the acidified nanoparticles comprises acid groups, wherein each acidified nanoparticle comprises an inorganic core and acid groups. Once formed, for example as free-flowing powders, these acidified nanoparticles can be more easily delivered, used, and stored, until the nanoparticles are subsequently combined with a composition containing a triorganoborane complex, as compared to liquid acid compounds. An advantage of employing acidified nanoparticles in the dual part polymerizable compositions includes a decrease in odor as compared to liquid acids.

In certain embodiments, the plurality of acidified nanoparticles further comprises free acid in an amount of no more than 50% by weight of the acid groups, or no more than 40%, or no more than 30%, or no more than 20%, or no more than 10%, or no more than 5%, or no more than 2%, or no more than 1% by weight of the acid groups. In an embodiment, the plurality of acidified nanoparticles further comprises no free acid. In certain embodiments, the plurality of acidified nanoparticles further comprises free acid in an amount of no more than 50 mole percent of the acid groups, or no more than 40 mole percent, or no more than 30 mole percent, or no more than 20 mole percent, or no more than 10 mole percent, or no more than 5 mole percent, or no more than 2 mole percent, or no more than 1 mole percent of the acid groups. In other words, in some embodiments the plurality of nanoparticles will comprise no more than half as many moles of free acid as of acid groups (i.e., 50 mole percent).

In certain embodiments, the acid groups comprise acid stabilizers, such as carboxylic acids. In some embodiments, the acid stabilizers are selected from the group consisting of, (C1-C4)monocarboxylic acids, (C2-C6)dicarboxylic acids, (C6-C14)aryl carboxylic acids, and combinations thereof. Suitable acid stabilizers include for example and without limitation acetic acid, formic acid, propanoic acid, propionic acid, butanoic acid, benzoic acid, oxalic acid, salicylic acid, malonic acid, succinic acid, glutaric acid, adipic acid, maleic acid, fumaric acid, phthalic acid, isophthalic acid, and terephthalic acid. Without wishing to be bound by theory, it is believed that the acid stabilizers comprise hydrogen bonding interactions with a surface of the inorganic core of a nanoparticle. An advantage of employing acidified nanoparticles having acid groups comprising acid stabilizers is that no processing steps are needed to create the interaction between the acid stabilizers and the nanoparticles.

In certain embodiments, the acid groups comprise acid groups covalently bound to the inorganic core through an organic group. Such acidified nanoparticles preferably have a structure wherein the acid groups are covalently bound to the inorganic core through an organic group having the structure -AYn where A is a (C1-C16)alkylene group, a (C1-C16)heteroalkylene group, a (C6-C14)aryl group, a (C6-C14)cycloalkyl group, or a combination thereof; Y is a sulfonic acid, a carboxylic acid, or a phosphonic acid; and n is 1 or 2.

Such a structure may be depicted as follows:

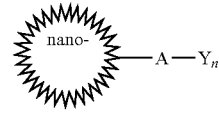

In certain embodiments, the covalently bound acid groups comprise sulfonic acid groups, carboxylic acid groups, phosphonic acid groups, or combinations thereof. For example and without limitation, suitable covalently bound acid groups are provided by (C$_2$-C$_{16}$)monocarboxylic acids, (C$_2$-C$_{16}$)dicarboxylic acids, (C$_6$-C$_{14}$)aryl carboxylic acids, (C$_2$-C$_{16}$)monosulfonic acids, (C$_2$-C$_{16}$)disulfonic acids, (C$_6$-C$_{14}$) aryl sulfonic acids, (C$_2$-C$_{16}$)monophosphonic acids, (C$_2$-C$_{16}$)diphosphonic acids, (C$_6$-C$_{14}$)aryl phosphonic acids, or combinations thereof.

Acidified nanoparticles comprising covalently bound acid groups are preferably prepared by functionalizing the particles with the acid groups disclosed above. Thus, the inorganic nanoparticles that include covalently bound acid groups can be made by a method that includes: providing inorganic oxide nanoparticles; providing one or more acid groups; and combining the one or more acid groups and inorganic nanoparticles under conditions effective to form the acidified inorganic nanoparticles that include covalently bound acid groups.

In certain embodiments, combining the one or more acid groups and inorganic nanoparticles can be done by a method that includes mixing them together in a solvent, which is subsequently removed from the resultant surface-modified nanoparticles that include an inorganic core and acid groups as described herein. Typically, in this method, the solvent is selected from alkanes (e.g., hexane), aromatics (e.g., toluene), ethers (e.g., THF), or combination thereof.

In certain embodiments, combining the one or more acid groups and inorganic nanoparticles can be done by a method that includes: adding the one or more acid groups in a solvent to dry inorganic nanoparticles, such as, for example, by spraying; and agitating the nanoparticles to evaporate the solvent from the resultant surface-modified inorganic nanoparticles that include an inorganic core and acid groups as described herein. Typically, in this method, the solvent is tetrahydrofuran (THF) or hexane.

Combining the one or more acid groups and inorganic nanoparticles can be done in air, or it can be done in an inert atmosphere, such as in a nitrogen atmosphere. Combining the one or more acid groups and inorganic nanoparticles can be done at any temperature, including lower temperatures (e.g., −20° C., −10° C., or 0° C.), room temperature, and higher temperatures (e.g., temperatures as high as the boiling point of the solvent).

In certain embodiments, the inorganic core of each acidified nanoparticle comprises at least one hydrophobic group covalently bound to a surface of the inorganic core. For example, the at least one hydrophobic group optionally comprises an (C3-C16)alkyl group, a (C6-C14)aryl group, a cycloalkyl group, or a combination thereof.

The acidified nanoparticles of the present disclosure can also function as reinforcing fillers in polymerizable systems, such as curable adhesives and other curable multi-part formulations. Thus, these solid, dispersible, nanoparticles are useful as decomplexing agents of triorganoborane-amine complexes, and can be used to prepare a two part dual-cure system. Because the acid decomplexing agent is preferably in a solid form, the amount of such agent can be more easily delivered and the amount delivered more controllable compared to an acid that is in a liquid form.

Alternatively, the acidified nanoparticles of the present disclosure can be provided in a dispersion of a plurality of acidified nanoparticles in a liquid. Such a dispersion or liquid is preferably compatible with the polymerizable component of the dual part polymerizable composition, which can be a liquid.

Triorganoborane-Amine Complexes

In embodiments, the triorganoborane-amine complex is a free complex that includes at least one triorganoborane-amine complex having the structure Z—NHR$^1$—B(R$^2$)$_3$. Such liquid complexes are free-radical precursor complexes.

In such free complexes, Z is an organic group, for example a monovalent organic group. In certain embodiments, Z is an organic group having 1 to 30 carbon atoms. In certain embodiments, Z is an organic group having 1 to 20 carbon atoms. In certain embodiments, Z is an organic group having 1 to 10 carbon atoms. In certain embodiments, Z is an organic group having 1 to 6 carbon atoms. In certain embodiments, Z is an organic group having 1 to 3 carbon atoms. In certain embodiments, Z is an alkylene group.

The R$^1$ and R$^2$ groups are selected such that a Lewis acid-base triorganoborane-amine complex readily forms between amine groups and a triorganoborane compound. This includes selecting such groups based on electronic and steric considerations. For example, it is desirable that R$^1$ not be too sterically hindering, or too electron withdrawing such that a Lewis acid-base complex would not form.

In such complexes, R$^1$ is H or an organic group. In certain embodiments, R$^1$ is H, an alkyl group, an aryl group, a cycloalkyl group, or a combination thereof (e.g., an aralkyl, an alkaryl, or an alkyl substituted with a cycloalkyl). In certain embodiments, R$^1$ is methyl, ethyl, n-propyl, —CH$_2$-phenyl, or —CH$_2$-cyclohexyl. In certain embodiments, R$^1$ is H, an alkyl group, or a cycloalkyl group. In certain embodiments, R$^1$ is H, a (C1-C6)alkyl group, or a (C4-C8)cycloalkyl group. In certain embodiments, R$^1$ is H.

Preferred R$^1$ groups are not too sterically hindering such that a Lewis acid-base complex would not form. Sterically hindered groups such as phenyl, isopropyl, t-butyl, and cyclohexyl are not desirable, although if such bulky groups are not directly bonded to the nitrogen atom of the amine group, they can be used. Examples of such groups include —CH$_2$-phenyl or —CH$_2$-cyclohexyl. Even more preferred R$^1$ groups are methyl, ethyl, and propyl groups, as these allow for more facile formation of a Lewis acid-base complex.

In such complexes, each R$^2$ is independently an organic group bound to the boron atom through a carbon atom. In certain embodiments, each R$^2$ is independently an alkyl group, an aryl group, a cycloalkyl group, or a combination thereof (e.g., an aralkyl group, or an alkaryl group). In certain embodiments, each R$^2$ is independently an alkyl group, a cycloalkyl group, an aralkyl group, or an alkaryl group. In certain embodiments, each R$^2$ is independently a (C1-C20)alkyl group, a (C4-C8)cycloalkyl group, a (C6-C14)ar(C1-C10)alkyl group, or a (C1-C10)alk(C6-C14)aryl group. In certain embodiments, each R$^2$ group is an alkyl group having 1 to 10 carbon atoms, 1 to 6 carbon atoms, or 1 to 4 carbon atoms. In certain embodiments, each R$^2$ is independently an alkyl group or a cycloalkyl group. In certain embodiments, each R$^2$ is independently a (C1-C20)alkyl group, a (C4-C8)cycloalkyl group. In certain embodiments, each R$^2$ is the same in the structure Z—NHR$^1$—B(R$^2$)$_3$.

Preferred R$^2$ groups are not too electron donating such that a Lewis acid-base complex would not form. Typically, electron donating groups such as aryl groups are not as desirable as alkyl and cycloalkyl groups, although if such groups are not directly bonded to the boron atom of the triorganonoborane group, they can be used.

In certain embodiments of the triorganoborane-amine complex having the structure Z—NHR$^1$—B(R$^2$)$_3$, Z is an organic group having 1 to 30 carbon atoms; R$^1$ is H, an alkyl group, or a cycloalkyl group; and each R$^2$ is independently an alkyl group, a cycloalkyl group, an aralkyl group, or an alkaryl group.

In certain embodiments of the triorganoborane-amine complex having the structure Z—NHR$^1$—B(R$^2$)$_3$, Z is an organic group having 1 to 20 carbon atoms; R$^1$ is H or a (C1-C6)alkyl group or a (C4-C8)cycloalkyl group; and each R$^2$ is independently a (C1-C20)alkyl group, a (C4-C8) cycloalkyl group, a (C6-C14)ar(C1-C10)alkyl group, or a (C1-C10)alk(C6-C14)aryl group.

In certain embodiments of the triorganoborane-amine complex having the structure Z—NHR$^1$—B(R$^2$)$_3$, Z is an organic group having 1 to 3 carbon atoms; R$^1$ is H; and each R$^2$ is independently a (C1-C6)alkyl group.

Nanoparticles

Nanoparticles of the present disclosure include an inorganic core, particularly an inorganic oxide core (e.g., zirconia, titania, silica, ceria, alumina, iron oxide, vanadia, germanium oxide, zinc oxide, antimony oxide, tin oxide, and alumina-silica). In some embodiments, the nanoparticles include silica, zirconia, or mixtures thereof. In certain embodiments of a dual part polymerizable composition comprising acidified nanoparticles (e.g., an inorganic core including acid stabilizers and/or acid groups covalently bound to the nanoparticles), the inorganic core comprises an inorganic oxide core. In such embodiments, each inorganic core independently comprises zirconia, titania, silica, ceria, alumina, iron oxide, vanadia, germanium oxide, zinc oxide, antimony oxide, tin oxide, or alumina-silica, preferably zirconia, silica, or alumina, for instance silica.

The nanoparticle can include an oxide of a non-metal, an oxide of a metal, or combinations thereof. An oxide of a non-metal includes an oxide of, for example, silicon or germanium. An oxide of a metal includes an oxide of, for example, iron, titanium, cerium, vanadium, antimony, tin, aluminum, or zirconium.

The nanoparticle can have an average particle size of no greater than 100 nanometers (nm), no greater than 75 nanometers, no greater than 50 nanometers, no greater than 25 nanometers, no greater than 20 nanometers, no greater than 15 nanometers, or no greater than 10 nanometers. The nanoparticle can have an average particle size of at least 1 nanometer, at least 5 nanometers, at least 15 nanometers, at least 20 nanometers, at least 25 nanometers, at least 50 nanometers, or at least 75 nanometers.

Various nanoparticles are commercially available. Commercial sources of nanoparticles are available from Nyacol Co. (Ashland, Mass.), Solvay-Rhodia (Lyon, France), and Nalco Co. (Naperville, Ill.). Nanoparticles can also be made using techniques known in the art. For example, zirconia nanoparticles can be prepared using hydrothermal technology as described, for example, in PCT Publication No. WO 2009/085926 (Kolb et al.).

Preferably, the inorganic (non-surface-modified) nanoparticles can be silica nanoparticles that are provided in an aqueous or in a water/organic solvent mixture having an average particle diameter of 40 nanometers or less, preferably 20 nanometers or less, and more preferably 10 nanometers or less. The average particle size may be determined using transmission electron microscopy.

In some embodiments, the (non-surface-modified) nanoparticles may be in the form of a colloidal dispersion. Colloidal silica nanoparticles in aqueous media are well known in the art and available commercially. Silica sols in water or water-alcohol solutions are available commercially under such trade names as LUDOX (available from Sigma-Aldrich Corp., St. Louis, Mo.), NYACOL (available from Nyacol Co., Ashland, Mass.), and NALCO (available from Nalco Co., Naperville, Ill.).

One useful silica sol is NALCO 2326 available as a silica sol with mean particle size of 5 nanometers, pH 10.5, and solid content 15% by weight, available from Nalco Co., Naperville, Ill. Other commercially available silica nanoparticles include NALCO 1115, NALCO 1130, NALCO 1040, NALCO 1050, NALCO 1060, NALCO 2327, and NALCO 2329 available from Nalco Co., REMASOL SP30, commercially available from Remet Corp., and LUDOX SM, commercially available from Sigma-Aldrich.

Zirconia nanoparticle dispersions are available from Nalco Chemical Co. under the trade designation NALCO OOSSOO8 and from Buhler AG, Uzwil, Switzerland under the trade designation BUHLER ZIRCONIA Z-WO. Suitable zirconia nanoparticles are also those described in, for example, U.S. Pat. No. 7,241,437 (Davidson, et al.).

The nanoparticles may be fully condensed. Fully condensed nanoparticles (with the exception of amorphous silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g., zirconia) nanoparticles have a high refractive index whereas amorphous nanoparticles typically have a lower refractive index.

Optional Groups Bound to Nanoparticles

The nanoparticles may include surface modifying groups other than the covalently bound acid groups or the acid stabilizers. For example, the nanoparticles may further include amine-functional organic groups directly bound to the nanoparticles.

Also, the nanoparticles may include additional stabilizing (typically, non-amine-functional) organic groups directly bound to the nanoparticles. Such organic groups are separate and distinct from (i.e., not part of) covalently-bound acid groups or any amine-functional organic groups that may be bound to the nanoparticles. The additional stabilizing organic groups can be selected from a wide variety of conventional functional groups bound to nanoparticles. Typically, they are selected to stabilize a plurality of the inorganic nanoparticles when dispersed in a liquid (e.g., water, alcohols (e.g., methanol, ethanol, 1-methoxy-2-propanol, or glycols), or combinations thereof) before covalently binding the nanoparticles with acids. Such additional stabilizing (typically, non-amine-functional) organic groups include (C1-C30) organic groups optionally containing catenary oxygen atoms and other functional groups (e.g., OH groups). In certain embodiments, the additional stabilizing organic groups include a (C3-C16)alkyl group, a (C6-C14) aryl group, or combinations thereof (alkaryl or aralkyl groups). In certain embodiments, the additional stabilizing organic group is a (C3-C16)alkyl group.

The amine-functional organic groups and the additional stabilizing organic groups can be covalently bound to inorganic oxide nanoparticles through an attachment group containing a —Si—O—Si— linkage.

Thus, in certain embodiments, the amine-functional organic groups are provided by a compound of the formula A-ZNHR$^1$, wherein A is a group that reacts with the surface of the nanoparticle to attach the group —ZNHR$^1$ to the surface, wherein Z and R$^1$ are as defined herein for —Z—NHR$^1$—B(R$^2$)$_3$. The A group can be a hydrolyzable silyl group such as a group of formula —Si(R$^3$)(R$^4$)$_2$ where R$^3$ is a hydrolyzable group and R$^4$ is a hydrolyzable group or a non-hydrolyzable group. In many embodiments, the A group is a tri(alkoxy)silyl group such as a trimethoxysilyl group or triethoxysilyl group. Exemplary compounds of the formula A-ZNHR$^1$ include, for example, 3-aminopropyltrimethoxysilane, and N-phenyl-3-aminopropyltrimethoxysilane, 3-aminopropyltriethoxysilane, 3-aminopropyldiethoxymethylsilane, 3-aminopropyldimethylethoxysilane, m-aminophenyltrimethoxysilane, p-aminophenyltrimethoxysilane, and 11-aminoundecyltriethoxysilane.

In certain embodiments, the additional stabilizing organic groups are provided by a compound of the formula A-Q, wherein A is the same as above and Q is the stabilizing organic group. In certain embodiments, Q is a (C1-C30) organic group optionally containing catenary oxygen atoms and other functional groups (e.g., OH groups). In certain embodiments, Q is a (C3-C16)alkyl group, a (C6-C14)aryl group, or combinations thereof (alkaryl or aralkyl groups). Preferred Q groups are (C3-C16)alkyl groups such as methyl, ethyl, branched and unbranched propyl, butyl, pentyl, hexyl, heptyl, octyl, nonyl, decyl, undecyl, dodecyl, tridecyl, tetradecyl, pentadecyl, and hexadecyl groups or (C6-C14)aryl groups such as phenyl groups.

Exemplary compounds of the formula A-Q include, for example, isooctyltrimethoxysilane, n-hexadecyltrimethoxysilane, phenyltrimethoxysilane, n-octyltrimethoxysilane, n-octyltriethoxysilane, dodecyltrimethoxysilane, octadecyltrimethoxysilane, n-propyltrimethoxysilane, hexyltrimethoxysilane, methyltrimethoxysilane, methyltriethoxysilane, ethyltrimethoxysilane, ethyltriethoxysilane, isopropyltrimethoxysilane, isopropyltriethoxysilane, butyltrimethoxysilane, and butyltriethoxysilane.

Methods of Making Polymers

In one embodiment, a method of making a polymer is provided, wherein the method includes providing a first part including at least one triorganoborane-amine complex having the structure $Z-NHR^1-B(R^2)_3$ wherein: Z is an organic group; $R^1$ is H or an organic group; and each $R^2$ is independently an organic group bound to the boron atom through a carbon atom. The method further includes providing a second part including a polymerizable component and a plurality of acidified nanoparticles comprising acid groups, and combining the first part and the second part together. Each acidified nanoparticle comprises an inorganic core and acid groups, wherein the acid groups comprise acid stabilizers and/or acid groups covalently bound to the inorganic core through an organic group.

In some embodiments, the combining further comprises mixing the first part and the second part to form a mixture of the first part and the second part, and optionally further comprises allowing the mixture to react to form the polymer. In certain embodiments, providing the first part comprises charging the first part into a first chamber of a dispensing cartridge and charging the second part into a second chamber of the dispensing cartridge. Optionally, such a method further comprises mixing the first part and the second part in the container to form a mixture of the first part and the second part. In an embodiment, the mixture of the first part and the second part is coated onto a substrate, upon which it polymerizes.

In certain embodiments, the acid groups comprise acid stabilizers, such as carboxylic acids. In some embodiments, the acid stabilizers are selected from the group consisting of, (C1-C4)monocarboxylic acids, (C2-C6)dicarboxylic acids, (C6-C14)aryl carboxylic acids, and combinations thereof. Suitable acid stabilizers include for example and without limitation acetic acid, formic acid, propanoic acid, propionic acid, butanoic acid, benzoic acid, oxalic acid, salicylic acid, malonic acid, succinic acid, glutaric acid, adipic acid, maleic acid, fumaric acid, phthalic acid, isophthalic acid, and terephthalic acid. Without wishing to be bound by theory, it is believed that the acid stabilizers comprise hydrogen bonding interactions with a surface of the inorganic core of a nanoparticle.

In certain embodiments, the acid groups comprise acid groups covalently bound to the inorganic core through an organic group. Such acidified nanoparticles preferably have a structure wherein the acid groups are covalently bound to the inorganic core through an organic group having the structure -AYn wherein:

i. A is a (C1-C16)alkylene group, a (C1-C16)heteroalkylene group, a (C6-C14)aryl group, a (C6-C14)cycloalkyl group, or a combination thereof;
ii. Y is a sulfonic acid, a carboxylic acid, or a phosphonic acid; and
iii. n is 1 or 2.

In certain embodiments, the covalently bound acid groups comprise sulfonic acid groups, carboxylic acid groups, phosphonic acid groups, or combinations thereof. For example and without limitation, suitable covalently bound acid groups are provided by $(C_2-C_{16})$monocarboxylic acids, $(C_2-C_{16})$dicarboxylic acids, $(C_6-C_{14})$aryl carboxylic acids, $(C_2-C_{16})$monosulfonic acids, $(C_2-C_{16})$disulfonic acids, $(C_6-C_{14})$aryl sulfonic acids, $(C_2-C_{16})$monophosphonic acids, $(C_2-C_{16})$diphosphonic acids, $(C_6-C_{14})$aryl phosphonic acids, or combinations thereof.

Typically, the polymerizable component includes ethylenically unsaturated monomers, oligomers, as well as polymers having one or more ethylenically unsaturated group. Suitable compounds contain at least one ethylenically unsaturated bond and are capable of undergoing addition polymerization. Such free-radically polymerizable compounds include mono-, di- or poly-(meth)acrylates (i.e., acrylates and methacrylates) such as, methyl (meth)acrylate, ethyl acrylate, isopropyl methacrylate, n-hexyl acrylate, stearyl acrylate, allyl acrylate, glycerol triacrylate, ethyleneglycol diacrylate, diethyleneglycol diacrylate, triethyleneglycol dimethacrylate, 1,3-propanediol di(meth)acrylate, trimethylolpropane triacrylate, 1,2,4-butanetriol trimethacrylate, 1,4-cyclohexanediol diacrylate, pentaerythritol tetra(meth)acrylate, sorbitol hexacrylate, tetrahydrofurfuryl (meth)acrylate, bis[1-(2-acryloxy)]-p-ethoxyphenyldimethylmethane, bis[1-(3-acryloxy-2-hydroxy)]-p-propoxyphenyldimethylmethane, ethoxylated bisphenolA di(meth)acrylate, and trishydroxyethyl-isocyanurate trimethacrylate; (meth)acrylamides (i.e., acrylamides and methacrylamides) such as (meth)acrylamide, methylene bis-(meth)acrylamide, and diacetone (meth)acrylamide; urethane (meth)acrylates; the bis-(meth)acrylates of polyethylene glycols (preferably of molecular weight 200-500), copolymerizable mixtures of acrylated monomers such as those in U.S. Pat. No. 4,652,274 (Boettcher et al.), acrylated oligomers such as those of U.S. Pat. No. 4,642,126 (Zador et al.), and poly(ethylenically unsaturated) carbamoyl isocyanurates such as those disclosed in U.S. Pat. No. 4,648,843 (Mitra); and vinyl compounds such as styrene, diallyl phthalate, divinyl succinate, divinyl adipate and divinyl phthalate. Other suitable free-radically polymerizable compounds include siloxane-functional (meth)acrylates as disclosed, for example, in WO-00/38619 (Guggenberger et al.), WO-01/92271 (Weinmann et al.), WO-01/07444 (Guggenberger et al.), WO-00/42092 (Guggenberger et al.) and fluoropolymer-functional (meth)acrylates as disclosed, for example, in U.S. Pat. No. 5,076,844 (Fock et al.), U.S. Pat. No. 4,356,296 (Griffith et al.), EP-0373 384 (Wagenknecht et al.), EP-0201 031 (Reiners et al.), and EP-0201 778 (Reiners et al.). Preferably, the polymerizable component comprises one or more acrylate monomers. Mixtures of two or more free-radically polymerizable compounds can be used if desired.

In certain embodiments, the dual part polymerizable composition includes two polymerizable components, e.g., a first polymerizable component such as a thermoset component (e.g., a polyurea, a polyurethane or an epoxy thermoset), and a second polymerizable component such as a polymerizable acrylate component. The polymerizable acrylate component can be any polymerizable acrylate component comprising one or more acrylate or methacrylate monomers. In such embodiments, one of the polymerizable components is included in the first part with the at least one triorganoborane-amine complex, while the other is the polymerizable component in the second part with the acidified nanoparticles.

The components of a dual-cure system independently polymerize to form a cured material (e.g., a coating on a substrate). The thermoset component can polymerize to form, for example, a polyurea by the spontaneous reaction of an amine with an isocyanate. The acrylate component can polymerize to form an acrylic homopolymer or copolymer. The acrylic polymer can be crosslinked or not crosslinked. The thermoset and acrylic polymers in the cured material can be chemically bonded to each other (by, for example, including in the composition a compound that is reactive with both the thermoset component and the acrylate component), or they can form an interpenetrating polymer network (IPN), where the components are not chemically bonded to each other.

In one illustrative embodiment, a dual part polymerizable composition is a two-part system that can polymerize to form a polyurea (by spontaneous reaction of a polyamine component and a polyisocyanate component) and a polyacrylate (by polymerization of one or more acrylate monomers). In this embodiment, a first part comprises a polyamine component and the organoborane-amine complex, and a second part comprises a polyisocyanate component and one or more acrylate monomers. After the two parts are mixed, the polyamine component and the polyisocyanate component can spontaneously react to form a polyurea, and the released triorganoborane can react to initiate polymerization of the one or more acrylate monomers. Typically, such systems have an advantage over traditional polyurea, polyurethane, epoxy, or acrylate coatings, in that the two curable components provide a way to control or modify physical properties of the cured material, such as hardness and flexibility, by controlling the chemistry of each component.

ILLUSTRATIVE EMBODIMENTS

Embodiment 1 is a dual part polymerizable composition including (a) a first part comprising at least one triorganoborane-amine complex having the structure Z—NHR$^1$—B(R$^2$)$_3$ wherein: (i) Z is an organic group; (ii) R$^1$ is H or an organic group; and (iii) each R$^2$ is independently an organic group bound to the boron atom through a carbon atom; and (b) a second part comprising a polymerizable component and a plurality of acidified nanoparticles comprising acid groups, wherein each acidified nanoparticle comprises an inorganic core and acid groups, wherein the acid groups comprise acid stabilizers, acid groups covalently bound to the inorganic core through an organic group, or combinations thereof.

Embodiment 2 is a dual part polymerizable composition of embodiment 1 wherein the plurality of acidified nanoparticles comprises acid stabilizers.

Embodiment 3 is a dual part polymerizable composition of embodiment 1 or embodiment 2 wherein the acid stabilizers comprise carboxylic acids.

Embodiment 4 is a dual part polymerizable composition of any one of embodiments 1 through 3 wherein the acid stabilizers are selected from the group consisting of, (C$_1$-C$_4$)monocarboxylic acids, (C$_2$-C$_6$)dicarboxylic acids, (C$_6$-C$_{14}$)aryl carboxylic acids, and combinations thereof.

Embodiment 5 is a dual part polymerizable composition of any one of embodiments 1 through 4 wherein the acid stabilizers are selected from the group consisting of acetic acid, formic acid, propanoic acid, butanoic acid, benzoic acid, oxalic acid, salicylic acid, malonic acid, succinic acid, glutaric acid, adipic acid, maleic acid, fumaric acid, phthalic acid, isophthalic acid, and terephthalic acid.

Embodiment 6 is a dual part polymerizable composition of any one of embodiments 1 through 5 wherein the acid stabilizers comprise hydrogen bonding interactions with a surface of the inorganic core.

Embodiment 7 is a dual part polymerizable composition of any one of embodiments 1 through 6 wherein the plurality of acidified nanoparticles comprises a free acid in an amount of no more than 50% by weight of the acid groups.

Embodiment 8 is a dual part polymerizable composition of embodiment 1 wherein the acid groups covalently bound to the inorganic core through an organic group have the structure -AY$_n$ wherein: (i.) A is a (C$_1$-C$_{16}$)alkylene group, a (C$_1$-C$_{16}$)heteroalkylene group, a (C$_6$-C$_{14}$)aryl group, a (C$_6$-C$_{14}$)cycloalkyl group, or a combination thereof; (ii) Y is a sulfonic acid, a carboxylic acid, or a phosphonic acid; and (iii) n is 1 or 2.

Embodiment 9 is a dual part polymerizable composition of any one of embodiments 1 through 8 wherein the covalently bound acid groups comprise sulfonic acid groups, carboxylic acid groups, phosphonic acid groups, or combinations thereof.

Embodiment 10 is a dual part polymerizable composition of any one of embodiments 1 through 9 wherein the covalently bound acid groups are provided by (C$_2$-C$_{16}$)monocarboxylic acids, (C$_2$-C$_{16}$)dicarboxylic acids, (C$_6$-C$_{14}$)aryl carboxylic acids, (C$_2$-C$_{16}$)monosulfonic acids, (C$_2$-C$_{16}$)disulfonic acids, (C$_6$-C$_{14}$)aryl sulfonic acids, (C$_2$-C$_{16}$)monophosphonic acids, (C$_2$-C$_{16}$)diphosphonic acids, (C$_6$-C$_{14}$)aryl phosphonic acids, or combinations thereof.

Embodiment 11 is a dual part polymerizable composition of any one of embodiments 1 through 10 wherein the inorganic core comprises at least one hydrophobic group covalently bound to a surface of the inorganic core.

Embodiment 12 is a dual part polymerizable composition of embodiment 11, wherein the at least one hydrophobic group comprises a (C$_3$-C$_{16}$)alkyl group, a (C$_6$-C$_{14}$)aryl group, a cycloalkyl group, or a combination thereof.

Embodiment 13 is a dual part polymerizable composition of any one of embodiments 1 through 12 wherein the inorganic core comprises an inorganic oxide core.

Embodiment 14 is a dual part polymerizable composition of any one of embodiments 1 through 12 wherein the inorganic core comprises zirconia, titania, silica, ceria, alumina, iron oxide, vanadia, germanium oxide, zinc oxide, antimony oxide, tin oxide, or alumina-silica.

Embodiment 15 is a dual part polymerizable composition of any one of embodiments 1 through 14 wherein the inorganic core comprises zirconia, silica, or alumina.

Embodiment 16 is a dual part polymerizable composition of any one of embodiments 1 through 15 wherein the inorganic core comprises silica.

Embodiment 17 is a dual part polymerizable composition of any one of embodiments 1 through 16 wherein Z is a monovalent organic group having 1 to 30 carbon atoms.

Embodiment 18 is a dual part polymerizable composition of any one of embodiments 1 through 17 wherein R$^1$ is H, an alkyl group, an aryl group, a cycloalkyl group, or a combination thereof.

Embodiment 19 is a dual part polymerizable composition of any one of embodiments 1 through 18 wherein R$^1$ is methyl, ethyl, n-propyl, —CH$_2$-phenyl, or —CH$_2$-cyclohexyl.

Embodiment 20 is a dual part polymerizable composition of any one of embodiments 1 through 19 wherein each R$^2$ is independently an alkyl group, an aryl group, a cycloalkyl group, or a combination thereof.

Embodiment 21 is a dual part polymerizable composition of any one of embodiments 1 through 18 wherein: (a) Z is an organic group having 1 to 20 carbon atoms; (b) R$^1$ is H or a (C$_1$-C$_6$)alkyl group or a (C$_4$-C$_8$)cycloalkyl group; and (c) each R$^2$ is independently a (C$_1$-C$_{20}$)alkyl group, a (C$_4$-C$_8$)cycloalkyl group, a (C$_6$-C$_{14}$)ar(C$_1$-C$_{10}$)alkyl group, or a (C$_1$-C$_{10}$)alk(C$_6$-C$_{14}$)aryl group.

Embodiment 22 is a dual part polymerizable composition of any one of embodiments 1 through 19 wherein: (a) Z is an organic group having 1 to 3 carbon atoms; (b) R$^1$ is H; and (c) each R$^2$ is independently a (C$_1$-C$_6$)alkyl group.

Embodiment 23 is a method of making a polymer comprising: (a) providing a first part comprising at least one triorganoborane-amine complex having the structure Z—NHR$^1$—B(R$^2$)$_3$ wherein: (i) Z is an organic group; (ii) R$^1$ is H or an organic group; and (iii) each R$^2$ is independently an organic group bound to the boron atom through a carbon atom; (b) providing a second part comprising a polymerizable component and a plurality of acidified nanoparticles comprising acid groups, wherein each acidified nanoparticle comprises an inorganic core and acid groups, wherein the acid groups comprise acid stabilizers, acid groups covalently bound to the inorganic core through an organic group, or combinations thereof; and (c) combining the first part and the second part together.

Embodiment 24 is a method of embodiment 23 wherein the combining further comprises mixing the first part and the second part to form a mixture of the first part and the second part.

Embodiment 25 is a method of embodiment 24 further comprising allowing the mixture to react to form the polymer.

Embodiment 26 is a method of any one of embodiments 23 through 25 wherein the providing the first part comprises charging the first part into a first chamber of a dispensing cartridge, and wherein the providing the second part comprises charging the second part into a second chamber of the dispensing cartridge.

Embodiment 27 is a method of embodiment 26 further comprising dispensing the contents of the first chamber and the second chamber of the dispensing cartridge into a container.

Embodiment 28 is a method of embodiment 27 further comprising mixing the first part and the second part in the container to form a mixture of the first part and the second part.

Embodiment 29 is a method of embodiment 24 or embodiment 28 further comprising coating the mixture onto a substrate.

Embodiment 30 is a method of any one of embodiments 23 through 29 wherein the polymerizable component comprises one or more acrylate monomers.

Embodiment 31 is a method of any one of embodiments 23 through 30 wherein the plurality of acidified nanoparticles comprises acid stabilizers.

Embodiment 32 is a method of any one of embodiments 23 through 31 wherein the acid stabilizers are selected from the group consisting of, (C$_1$-C$_4$)monocarboxylic acids, (C$_2$-C$_6$)dicarboxylic acids, (C$_6$-C$_{14}$)aryl carboxylic acids, and combinations thereof.

Embodiment 33 is a method of any one of embodiments 23 through 32 wherein the acid stabilizers comprise hydrogen bonding interactions with a surface of the inorganic core.

Embodiment 34 is a method of any one of embodiments 23 through 33 wherein the plurality of acidified nanoparticles comprises a free acid in an amount of no more than 50% by weight of the acid groups.

Embodiment 35 is a method of any one of embodiments 23 through 34 wherein the acid groups covalently bound to the inorganic core through an organic group have the structure -AY$_n$ wherein: (i) A is a (C$_1$-C$_{16}$)alkylene group, a (C$_1$-C$_{16}$)heteroalkylene group, a (C$_6$-C$_{14}$)aryl group, a (C$_6$-C$_{14}$)cycloalkyl group, or a combination thereof; (ii) Y is a sulfonic acid, a carboxylic acid, or a phosphonic acid; and (iii) n is 1 or 2.

Embodiment 36 is a method of any one of embodiments 23 through 34 wherein the covalently bound acid groups comprise sulfonic acid groups, carboxylic acid groups, phosphonic acid groups, or combinations thereof.

Embodiment 37 is a method of any one of embodiments 23 through 34 wherein the covalently bound acid groups are provided by (C$_2$-C$_{16}$)monocarboxylic acids, (C$_2$-C$_{16}$)dicarboxylic acids, (C$_6$-C$_{14}$)aryl carboxylic acids, (C$_2$-C$_{16}$)monosulfonic acids, (C$_2$-C$_{16}$)disulfonic acids, (C$_6$-C$_{14}$)aryl sulfonic acids, (C$_2$-C$_{16}$)monophosphonic acids, (C$_2$-C$_{16}$) diphosphonic acids, (C$_6$-C$_{14}$)aryl phosphonic acids, and combinations thereof.

EXAMPLES

Objects and advantages of this disclosure are further illustrated by the following examples, but the particular materials and amounts thereof recited in these examples, as well as other conditions and details, should not be construed to unduly limit this disclosure.

The following examples are merely for illustrative purposes and are not meant to limit in any way the scope of the appended claims. All parts, percentages, ratios, and the like in the examples are by weight, unless noted otherwise. Unit abbreviations used include h=hours, gm=grams, wt=weight, cm=centimeter. Unless otherwise stated, materials were obtained from Sigma-Aldrich, St. Louis, Mo.

Preparative Example 1

A 500 mL 3-neck round bottom flask, equipped with a mechanical stirrer, a thermometer and a reflux condenser was charged with an aqueous dispersion of silica (100 grams; Nalco 2326, obtained from Nalco Company, Naperville, Ill.) and an aqueous solution of 3-(trihydroxysilyl)-1-propanesulfonic acid (12.06 grams; obtained from Gelest Inc, Morrisville, Pa.). The flask was placed in an oil bath, and the mixture was stirred and heated at 50° C. overnight. The mixture was then poured into a glass dish and was dried in a forced air oven at 100° C. to afford the product.

Preparative Example 2

An acid-stabilized zirconia sol, prepared according to the procedures described in U.S. Patent Application Publication No. 20100276374, was poured into a glass dish and was dried in an oven at 100° C. to afford a powder.

Example 1

A glass vial was charged with 10 grams of a mixture of methyl methacrylate (55.9 weight percent), a methyl methacrylate copolymer (25.2 weight percent; ELVACITE 2013, obtained from Lucite International, Cordova, Tenn.), and titanium dioxide (18.9 weight percent; Ti-PURE R-960 available from E.I. du Pont de Nemours and Company, Wilmington, Del.). The sulfonic acid modified silica nanoparticles of Preparative Example 1 (1.0 gram) was then stirred into the mixture. A complex of tri-n-butylborane and 3-methoxypropylamine (0.09 grams; TNBB-MOPA, obtained from BASF, Evans City, Pa.) was then added to the mixture. As the mixture was stirred using a spatula, it became increasingly viscous. After approximately 1.5 hours, the mixture was a solid.

Example 2

A glass vial was charged with 13.8 grams of a mixture of methyl methacrylate (55.9 weight percent), a methyl methacrylate copolymer (25.2 weight percent; ELVACITE 2013, obtained from Lucite International, Cordova, Tenn.), and titanium dioxide (18.9 weight percent; Ti-PURE R-960 available from E.I. du Pont de Nemours and Company, Wilmington, Del.). The sulfonic acid modified silica nanoparticles of Preparative Example 1 (5.2 grams) was then stirred into the mixture. A complex of triethylborane and 1,3-diaminopropane (0.09 grams; TEB-DAP, obtained from BASF, Evans City, Pa.) was then added to the mixture. The viscous mixture was coated onto a silicone-coated polyester release liner. After approximately 40 minutes, the coating was polymerized and was hard and brittle.

Examples 3-6

Individual glass vials were charged with 4 mL of methyl methacrylate. A weighed amount of the sulfonic acid modified silica nanoparticles of Preparative Example 1 was then stirred into the methyl methacrylate (0.11 grams in Example 3, 0.51 grams in Example 4, 0.98 grams in Example 5, and 2.16 grams in Example 6). A complex of tri-n-butylborane and 3-methoxypropylamine (0.02 mL; TNBB-MOPA, obtained from BASF, Evans City, Pa.) was then added to each mixture in its vial. Each mixture was briefly stirred using a spatula. Changes in the viscosity of each mixture, a qualitative measure of the extent of polymerization of the methyl methacrylate, was monitored by tilting each vial and observing the mixtures over time. The viscosities of the mixtures of each of Examples 3-6 increased over time. The relative viscosities at various times after addition of the TNBB-MOPA were Example 6>Example 5>Example 4>Example 3. Each mixture polymerized to a solid.

Examples 7-8

Individual glass vials were charged with 4 mL of methyl methacrylate. The sulfonic acid modified silica nanoparticles of Preparative Example 1 (2.07 grams) was added to each vial and was stirred into the monomer. In Example 7, 0.4 mL of a complex of tri-n-butylborane and 3-methoxypropylamine (TNBB-MOPA, obtained from BASF, Evans City, Pa.) was then added to the mixture in its vial. In Example 8, 0.6 mL of TNBB-MOPA was added to the mixture in its vial. Each mixture was stirred using a spatula, and within 10 minutes the monomer in each vial polymerized to afford a hard polymer.

Example 9

2-Ethylhexyl acrylate (1.0 gram), the sulfonic acid modified silica nanoparticles of Preparative Example 1 (0.3 gram), and a complex of tri-n-butylborane and 3-methoxypropylamine (0.2 gram; TNBB-MOPA, obtained from BASF, Evans City, Pa.) were stirred together in a small dish. The acrylate monomer polymerized to a solid.

Example 10

A glass vial was charged with 4.0 mL of hexanediol diacrylate (SR238, obtained from Sartomer USA LLC, Exton, Pa.) and 1.27 grams of the dried acid-stabilized zirconia sol of Preparative Example 2. A complex of tri-n-butylborane and 3-methoxypropylamine (0.06 gram; TNBB-MOPA, obtained from BASF, Evans City, Pa.) was added to the vial and the mixture was stirred using a spatula. The viscosity of the mixture increased, and acrylate monomer polymerized to a solid within 5 minutes.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A dual part polymerizable composition comprising:
   a. a first part comprising at least one triorganoborane-amine complex having the structure Z—NHR$^1$—B(R$^2$)$_3$ wherein:
      i. Z is an organic group;
      ii. R$^1$ is H or an organic group; and
      iii. each R$^2$ is independently an organic group bound to the boron atom through a carbon atom; and
   b. a second part comprising a polymerizable component and a plurality of acidified nanoparticles comprising acid groups, wherein each acidified nanoparticle comprises an inorganic oxide core and acid groups, wherein the acid groups comprise acid stabilizers, acid groups covalently bound to the inorganic oxide core through an organic group, or combinations thereof.

2. The dual part polymerizable composition of claim 1 wherein the acid stabilizers are present and are selected from the group consisting of, (C$_1$-C$_4$)monocarboxylic acids, (C$_2$-C$_6$)dicarboxylic acids, (C$_6$-C$_{14}$)aryl carboxylic acids, and combinations thereof.

3. The dual part polymerizable composition of claim 2 wherein the acid groups covalently bound to the inorganic oxide core through an organic group have the structure -AY$_n$ wherein:
   i. A is a (C$_1$-C$_{16}$)alkylene group, a (C$_1$-C$_{16}$)heteroalkylene group, a (C$_6$-C$_{14}$)aryl group, a (C$_6$-C$_{14}$)cycloalkyl group, or a combination thereof;
   ii. Y is a sulfonic acid, a carboxylic acid, or a phosphonic acid; and
   iii. n is 1 or 2.

4. The dual part polymerizable composition of claim 1 wherein the acid stabilizers are present and are selected from the group consisting of acetic acid, formic acid, propanoic acid, butanoic acid, benzoic acid, oxalic acid, salicylic acid, malonic acid, succinic acid, glutaric acid, adipic acid, maleic acid, fumaric acid, phthalic acid, isophthalic acid, and terephthalic acid.

5. The dual part polymerizable composition of claim 1 wherein the acid stabilizers are present and comprise hydrogen bonding interactions with a surface of the inorganic oxide core.

6. The dual part polymerizable composition of claim 1 wherein the covalently bound acid groups are provided by (C$_2$-C$_{16}$)monocarboxylic acids, (C$_2$-C$_{16}$)dicarboxylic acids, (C$_6$-C$_{14}$)aryl carboxylic acids, (C$_2$-C$_{16}$)monosulfonic acids, (C$_2$-C$_{16}$)disulfonic acids, (C$_6$-C$_{14}$)aryl sulfonic acids, (C$_2$-C$_{16}$)monophosphonic acids, (C$_2$-C$_{16}$)diphosphonic acids, (C$_6$-C$_{14}$)aryl phosphonic acids, and combinations thereof.

7. The dual part polymerizable composition of claim 1 wherein the inorganic oxide core comprises zirconia, silica, or alumina.

8. The dual part polymerizable composition of claim 1 wherein:
   a. Z is an organic group having 1 to 20 carbon atoms;
   b. R$^1$ is H or a (C$_1$-C$_6$)alkyl group or a (C$_4$-C$_8$)cycloalkyl group; and c. each $R^2$ is independently a $(C_1$-$C_{20})$alkyl group, a $(C_4$-$C_8)$cycloalkyl group, a $(C_6$-$C_{14})$ar$(C_1$-$C_{10})$alkyl group, or a $(C_1$-$C_{10})$alk$(C_6$-$C_{14})$aryl group.

9. The dual part polymerizable composition of claim 1 wherein:
   a. Z is an organic group having 1 to 3 carbon atoms;
   b. $R^1$ is H; and
   c. each $R^2$ is independently a $(C_1$-$C_6)$alkyl group.

10. A method of making a polymer comprising:
    a. providing a first part comprising at least one triorganoborane-amine complex having the structure Z—NHR$^1$—B(R$^2$)$_3$ wherein:
       i. Z is an organic group;
       ii. $R^1$ is H or an organic group; and
       iii. each $R^2$ is independently an organic group bound to the boron atom through a carbon atom;
    b. providing a second part comprising a polymerizable component and a plurality of acidified nanoparticles comprising acid groups, wherein each acidified nanoparticle comprises an inorganic oxide core and acid groups, wherein the acid groups comprise acid stabilizers, acid groups covalently bound to the inorganic oxide core through an organic group, or combinations thereof; and
    c. combining the first part and the second part together.

11. The method of claim 10 wherein the combining further comprises mixing the first part and the second part to form a mixture of the first part and the second part.

12. The method of claim 11 further comprising allowing the mixture to react to form the polymer.

13. The method of claim 11 further comprising coating the mixture onto a substrate.

14. The method of claim 11 wherein the providing the first part comprises charging the first part into a first chamber of a dispensing cartridge, and wherein the providing the second part comprises charging the second part into a second chamber of the dispensing cartridge.

15. The method of claim 14 further comprising dispensing the contents of the first chamber and the second chamber of the dispensing cartridge into a container.

16. The method of claim 15 further comprising mixing the first part and the second part in the container to form a mixture of the first part and the second part.

17. The method of claim 10 wherein the polymerizable component comprises one or more acrylate monomers.

18. The method of claim 10 wherein the acid groups covalently bound to the inorganic oxide core through an organic group have the structure -AY$_n$ wherein:
    i. A is a $(C_1$-$C_{16})$alkylene group, a $(C_1$-$C_{16})$heteroalkylene group, a $(C_6$-$C_{14})$aryl group, a $(C_6$-$C_{14})$cycloalkyl group, or a combination thereof;
    ii. Y is a sulfonic acid, a carboxylic acid, or a phosphonic acid; and
    iii. n is 1 or 2.

19. The method of claim 10 wherein the covalently bound acid groups are provided by $(C_2$-$C_{16})$monocarboxylic acids, $(C_2$-$C_{16})$dicarboxylic acids, $(C_6$-$C_{14})$aryl carboxylic acids, $(C_2$-$C_{16})$monosulfonic acids, $(C_2$-$C_{16})$disulfonic acids, $(C_6$-$C_{14})$aryl sulfonic acids, $(C_2$-$C_{16})$monophosphonic acids, $(C_2$-$C_{16})$diphosphonic acids, $(C_6$-$C_{14})$aryl phosphonic acids, and combinations thereof.

20. The method of claim 10 wherein the acid stabilizers are present and are selected from the group consisting of, $(C_1$-$C_4)$monocarboxylic acids, $(C_2$-$C_6)$dicarboxylic acids, $(C_6$-$C_{14})$aryl carboxylic acids, and combinations thereof.

\* \* \* \* \*